(No Model.)

S. STRANDE.
BREAD CUTTER.

No. 529,537.  Patented Nov. 20, 1894.

Witnesses:
W. C. Coilies
Jno. A. Christianson

Inventor:
Sivert Strande.
By Coburn & Thacher
Atty's

UNITED STATES PATENT OFFICE.

SIVERT STRANDE, OF CHICAGO, ILLINOIS.

BREAD-CUTTER.

SPECIFICATION forming part of Letters Patent No. 529,537, dated November 20, 1894.

Application filed June 22, 1894. Serial No. 515,374. (No model.)

*To all whom it may concern:*

Be it known that I, SIVERT STRANDE, a citizen of the United States, residing at Chicago, in the county of Cook and State of Illinois, have invented a certain new and useful Improvement in Bread-Cutters, which is fully set forth in the following specification, reference being had to the accompanying drawings, in which—

Figure 1:
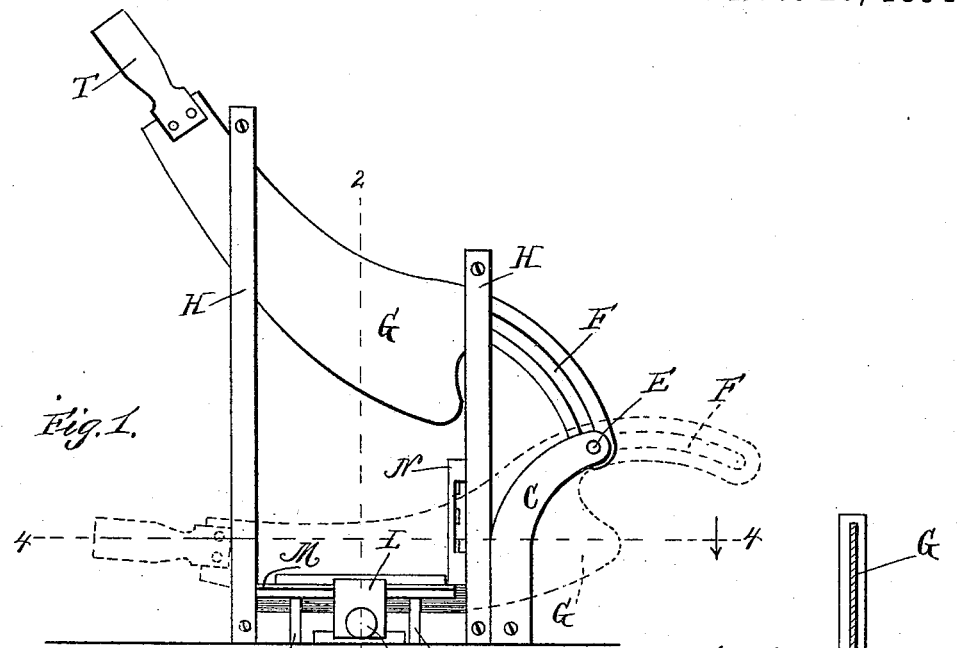
Figures 2, 3:
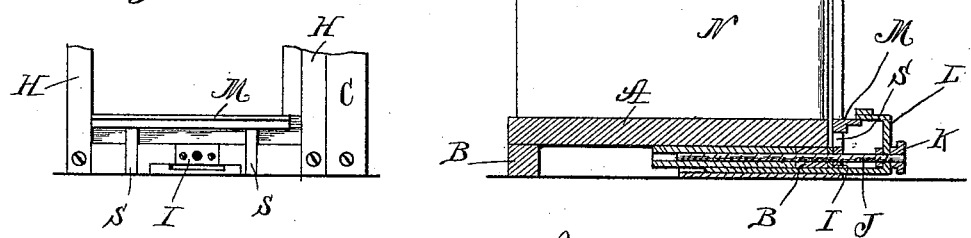
Figure 4:
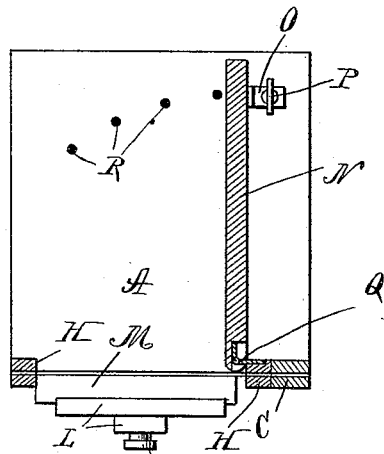

Figure 1 is an end elevation of my cutter; Fig. 2, a vertical, longitudinal view, taken at the line 2—2, Fig. 1. Fig. 3 is an end view of the lower part of my cutter, with the gage removed. Fig. 4 is a horizontal, sectional view, taken at the line 4—4, Fig. 1, looking down.

The object of my invention is to make a machine adapted to slice bread or similar articles, rapidly, and at the same time to make slices of uniform thickness.

My invention consists of the devices and combination of devices hereinafter fully set forth and made the subject matter of the claims hereof.

In the accompanying drawings, A represents what I term the base-plate of my machine, which is supported upon suitable supporting blocks, B, which together with the base-plate constitute what I call the frame of the machine.

C, is a bracket attached to the frame of the machine, which is provided with a bolt, E. This bolt also passes through the slot, F, in the shank of the knife.

G, is the knife with which the bread is cut.

H, are slotted uprights or posts rigidly attached to the frame of the machine, and serve as guides in which the knife moves up and down when in operation.

To the under side of the base-plate A, I attach a block, I, into which a screw-threaded bolt J passes. The block I has an internal screw-thread into which said bolt J is screwed.

K, is a thumb-piece for turning the bolt J.

The bolt J also passes through the slice-gage, L, the upper part of which passes over the ledge, M. The lower part passes into a recess in the block I, under the base-plate A, simply sliding in and out as the bolt J is turned. This device is for the purpose of regulating the thickness of the slices which are cut from a loaf of bread.

N, is a hinged swinging-board to which is attached the side bracket. O, through which a set-screw, P, passes to hold the hinged board at any desired angle to the cutting knife which slices the bread.

Q, are the hinges by which this hinged board is hinged to one of the guide-posts H that guide the cutting knife.

R, represents recesses in the base-board A, for the set-screw P to hold the swinging board A at any desired angle. This hinged board can be swung around so as to cut the bread from the center of a round loaf to the outside. When the bread is being cut from a square loaf or an oblong loaf, the hinged board is thrown into the position shown in Fig. 4, which is at right angles to the cutting-knife. The slot F in the shank of the cutting-knife admits of the knife sliding along as it is brought into cutting action upon the slices of bread, thereby making a sliding cut. The knife is shown in full lines in position as it is raised above the loaf of bread, and as it cuts it is thrown down into the position shown in dotted lines in Fig. 1, the slot F in the shank of the knife sliding along on the pin E, giving a sliding shearing cut to the loaf. If it is desired to cut thin slices, the bolt J is turned, moving the slice-gage L toward the knife. I am able to cut slices of bread of uniform thickness, and different thickness, from different shaped loaves of bread with my machine, which is of simple construction.

The ledge M is supported upon upright pieces, S, and the knife passes between this ledge and the end of the base-plate A when the bread is cut. The ledge M is level with the base-plate A, and the loaf of bread is placed against the slice-gage L which rests on the gage M. The thickness of the slice is regulated by sliding the slice-gage L in and out to and from the path of the knife. The loaf of bread is placed on the base-plate A, resting one side of it against the board N, and one end of it is pushed under the knife against the slice-gage L on the ledge M when the knife is brought down cutting the slice the thickness between the path of the knife and the slice-gage L. The slice being removed, the loaf is crowded out against the slice-gage L and another slice cut. The knife, of course, must be raised after cutting each slice. The operator takes hold of the knife-handle T, raising the knife to the upper end slots in the posts H, and after sliding the loaf out under it against the slice-gage L, throws the knife downward and at the same time sliding it forward on the pin E, making a shearing cut, as above described.

It will be observed that the shape of the cutting edge of the knife is convex, while the slot in the shank of the knife is curved reversely to the cutting edge of the knife, so that when the knife is thrown downwardly toward the position shown by the dotted lines in Fig. 1, the cutting edge of the knife across the bread beneath it has a sliding and somewhat shearing cut, which causes it to cut the bread smoothly and readily.

Having fully described the construction and operation of my invention, what I claim, and desire to secure by Letters Patent, is—

1. In a bread cutter, a base-plate on which the loaf to be sliced is placed; upright slotted guide-posts in which the knife is vertically guided; a swinging board hinged to one of the uprights which guide the knife, and provided with a bracket and a set-screw by which the swinging board is secured to the base-plate at any desired angle to the knife; and a convex knife with a reversely curved slot in its shank through which a pin passes to secure it to a bracket on the base-plate of the bread cutter, all as specified and shown.

2. In a bread cutter, a block secured to the under side of the base-plate of the bread cutter, and provided with an internal screw-thread to receive an adjusting bolt and a recess in which the slice-gage slides; a screw-bolt passing through the slice-gage and into the block attached to the under side of the base-plate; a slice-gage, the upper portion of which rests on a ledge at one end of the base-plate, the lower portion sliding in the block under the base-plate; a ledge located at the end of the base-plate with a space between it and the end of the base plate in which the edge of the knife passes as the slice is cut, as specified.

SIVERT STRANDE.

Witnesses:
ALOYSIA HELMICH,
ALLAN A. MURRAY.